Dec. 21, 1954     R. H. BLYTHE     2,697,784
LINEAR SWEEP CIRCUIT
Filed March 14, 1946
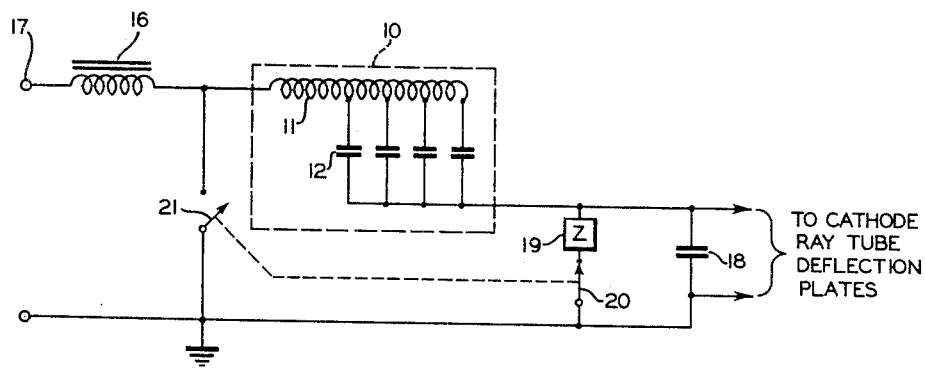
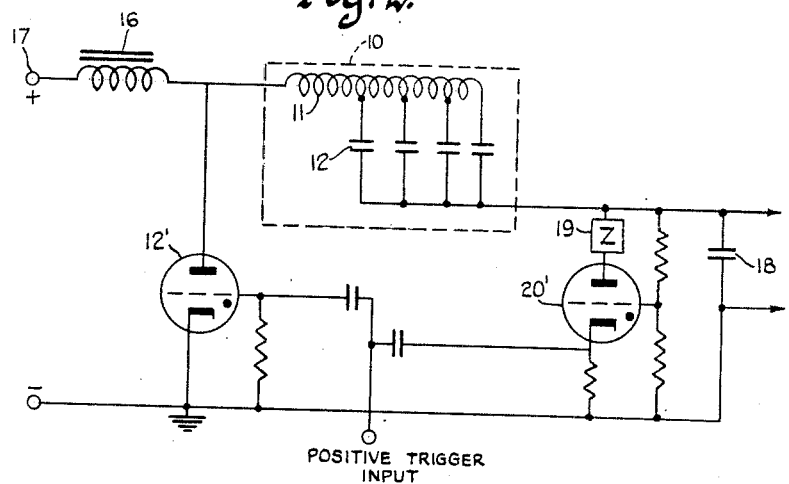
INVENTOR
RICHARD H. BLYTHE
BY  *M. Q. Hayes*
ATTORNEY

United States Patent Office 2,697,784
Patented Dec. 21, 1954

2,697,784

LINEAR SWEEP CIRCUIT

Richard H. Blythe, Boston, Mass., assignor, by mesne assignments, to the United States of America as represented by the Secretary of the Navy Application March 14, 1946, Serial No. 654,496

9 Claims. (Cl. 250—27)

This invention relates in general to a linear sweep circuit and more particularly concerns a novel linear sweep circuit adaptable for use with high frequency oscilloscopes or synchroscopes.

In order to sweep an electron beam across a cathode ray tube screen at a constant velocity proportional to time, a linear sweep voltage must be applied to the deflection elements of the cathode ray tube. Sweep voltages are usually obtained by making use of the change in voltage across a capacitor in a series resistance-capacitance combination. However, to obtain the necessary magnitude and rate of voltage rise for a high speed sweep while maintaining the desired linearity, larger charging voltages are required than are conveniently available.

The present invention employs a pulse forming network as a constant voltage charging device in a sweep circuit which is particularly suited to the production of high speed linear sweeps. By suitable design of the pulse forming network to discharge varying amounts of energy with time, high speed sweeps having other than linear form can also be obtained.

One object of this invention is to provide a linear sweep circuit for use with cathode ray tube oscilloscopes or synchroscopes.

Another object of this invention is the provision of a high speed, linear sweep voltage suitable for high frequency cathode ray oscilloscopes.

A further object of this invention is the provision of a high speed sweep voltage of a desired form other than linear.

These and other objects and features of this invention will become apparent from the following detailed specification taken in connection with the accompanying drawing, in which Figs. 1 and 2 are schematic wiring diagrams of the high speed sweep circuit of the invention.

Referring to both figures, pulse forming network 10 comprises a suitably designed artificial line, as is well known in the art, which may include a series inductive element 11 and shunt capacitive element 12. However, any of the analogous forms of pulse forming networks may be used. Upon being discharged, pulse forming network 10, hereinafter referred to as PFN, tends to discharge at a constant current and to generate a voltage pulse with a substantially constant amplitude over the duration of the pulse. PFN10 is charged by D. C. resonance through the agency of inductor 16 and a positive potential applied at terminal 17. A negative potential could also be applied. Briefly, D. C. resonance charging is based upon the fact that the application of a D. C. potential to a lossless, series resonant circuit will result in an alternating potential across the capacitor thereof having a peak voltage of theoretically twice the magnitude of the applied D. C. potential. A. C. resonance charging, resistance charging, and diode charging are but a few of the other means known to the art that could be employed to charge PFN10.

A load impedance is provided for PFN10 on discharging by connecting capacitor 18, shunted by impedance 19 in series with switch 20, between ground and the end of PFN10 remote from terminal 17, as shown in Figure 1. Switch 21 connected between ground and the junction of inductor 16 and PFN10 is normally open, allowing PFN10 to be charged from the potential source at terminal 17. When closed, switch 21 shunts PFN10 to ground, rendering the charging means for PFN10 inoperative and discharging PFN10 through load capacitor 18 and whatever impedance parallels it.

In the simplest case, impedance 19, labeled Z in the drawing, may be a resistor of high impedance relative to that of capacitor 18, and switch 20 can be considered to be always closed. Then starting with switch 21 open, PFN10 charges from terminal 17 to a potential approximately twice that applied. No charge accumulates on capacitor 18 because it is shunted and dissipated by the resistance of impedance 19. At a given moment, switch 21 closes, isolating PFN10 from its charging means and causing PFN10 to discharge into the load impedance consisting of capacitor 18 and the resistance of impedance 19. The resistance of impedance 19 is so high that during the short duration of the discharge pulse of PFN10, it is virtually an open circuit. Capacitor 18 charges effectively at a constant current from PFN10, which acts as a constant voltage source, and thus it will be evident from basic theory that a linearly rising voltage will appear across capacitor 18. If a pair of deflection plates of a cathode ray tube are connected as shown across capacitor 18, the electron beam will be swept linearly across the screen. When switch 21 opens to start a new charging cycle of PFN10, capacitor 18 discharges through impedance 19, and the electron beam will return to its starting point on the cathode ray tube screen.

With impedance 19 a high resistance, the discharge time of capacitor 18 may be too long relative to the charging time of PFN10. Therefore, to shorten the discharge time of capacitor 18 to ready it for the next charging or sweep cycle, impedance 19 might be eliminated. Switch 20 is then normally closed to bypass capacitor 18 during the charging of PFN10. Then, simultaneously with the closing of switch 21 to discharge PFN10, switch 20 opens, permitting capacitor 18 to be charged. At the end of this sweep cycle, switches 20 and 21 again resume their normal positions to provide respectively for discharge of capacitor 18 and charging of PFN10.

One form of switch in common use which satisfies the operating requirements of switches 20 and 21 is the thyratron tube, as shown in Figure 2. Conventional means for biasing and triggering the thyratrons 20' and 21' to render them condutive and non-conductive at will are shown to reverse simultaneously their normal states of conductivity as discussed with respect to the operation of Figure 1.

Other possible variations of impedance 19 include the use of an inductor and combinations of circuit elements such as are known in the art to improve the linearity of sweep voltages.

The particular circuit herein illustrated and described is subject to considerable modification depending upon the application thereof. Thus, although the circuit illustrated is particularly adaptable to high sweep speeds having a duration comparable to the short pulse widths obtainable from pulse forming networks, a suitable variation of the circuit constants will provide linear, slow sweep speeds. Furthermore, pulse forming networks can be designed to discharge energy in variable amounts with respect to time to provide sweeps which vary not linearly but according to some other desired function versus time.

Since the many modifications possible of the disclosed embodiment of this invention will be readily apparent to those skilled in the art, this invention is not to be limited except insofar as is necessitated by the prior art and the spirit and scope of the appended claims.

What is claimed is:

1. An electrical sweep circuit comprising, a pulse forming network, a capacitor in series with said network, a first switch normally open shunting said network and said series capacitor, means operative when said first switch is open for charging said pulse forming network, a second switch normally shorting said capacitor, and means for reversing the normal positions of said first and second switches simultaneously, whereby said pulse forming network is discharged at constant current into said capacitor across which is produced a linear sweep voltage.

2. An electrical sweep circuit comprising, a pulse forming network, a capacitor in series with said network, an impedance and a first normally closed switch in series shunting said capacitor, means for charging said pulse forming network, a second switch normally open shunting said network and said series capacitor, and means for reversing the normal positions of said first and second switches simultaneously, whereby said pulse forming network is discharged at constant current into said capacitor and shunting impedance across which is produced a linearly rising sweep voltage.

3. A linear sweep voltage generator comprising, a source of voltage, a pulse forming network, a condenser in series relationship with said voltage source and said network, a normally open first unilateral switching device in shunt with said voltage source, a series connected impedance and a normally closed switching device in shunt with said condenser forming a charging path for said network, means for extracting an output voltage across said condenser and means for simultaneously reversing the positions of said first and said second switching devices, said network being discharged into said condenser upon said reversal and producing a linear voltage rise at said means for extracting an output voltage.

4. A linear sweep voltage generator comprising a source of direct voltage, a pulse forming network, and a condenser in series relationship, a normally non-conductive first thyratron switching device in shunt with said voltage, a series connected impedance and normally conductive second thyratron switching device in shunt with said condenser, said impedance and said normally conductive second thyratron completing the series charging path of said network, means for extracting an output voltage connected across said condenser, and means for simultaneously reversing the conditions of non-conduction in said first thyratron switching device and conduction in said second thyratron switching devices to provide a discharge path for said network through said condenser, the voltage appearing across said condenser rising linearly to substantially the peak value of the voltage stored in said pulse network.

5. A linear sweep generator comprising a pulse forming network, means for charging said network through a first circuit, and means for periodically discharging said network through a second circuit, said second circuit comprising a capacitor adapted to be charged by the energy discharged from said network, said capacitor being effectively shorted during the charging period of said network.

6. A linear sweep generator comprising a source of voltage, a pulse forming network having a first terminal connected to said source and a second terminal, a capacitor coupled to said second terminal in series relationship with said voltage source and said network, a normally open first unilateral switching device connected on the first terminal side of said network in shunt with said voltage source, a normally closed second switch connected on the second terminal side of said network in shunt with said condenser, means for extracting an output voltage across said condenser, means for simultaneously reversing the positions of said first and second switching devices whereby said network is discharged into said condenser through said first switch and a linear voltage rise is produced at said voltage extracting means.

7. A linear sweep generator comprising a voltage source, a pulse forming network having first and second terminals, said first terminal being coupled to said voltage source, a condenser coupled by said second terminal to said network in series relationship with said voltage source and said network, a normally open first unilateral switch coupled at said first terminal in shunt relationship with said network, a normally closed second switch connected at said second terminal in shunt with said condenser and providing a charging path for said network, means for simultaneously reversing the positions of said first and second switch means whereby said network discharges through said first switch means into said condenser and means for extracting the voltage appearing across said condenser.

8. A linear sweep generator comprising a pulse forming network, a condenser in series with said network, means for applying voltage to said pulse forming network, means comprising part of the charging circuit for said network normally shunting said condenser, switch means normally in an open position connected in shunt relationship with said network, means for periodically closing said switch means, whereby the energy stored in said network is discharged to said condenser, said means shunting said condenser being non-conductive during the period that said network discharges, and means for extracting the voltage appearing across said condenser.

9. A linear sweep voltage generator comprising a source of voltage, an energy storage device adapted to discharge at a constant current, charging means coupling said source of voltage to said energy storage device whereby said energy storage device is charged, a condenser adapted to be charged in response to the discharging of said energy storage device, switch means coupling said condenser to said energy storage device adapted to periodically discharge said energy storage device, means for extracting an output voltage across said condenser, and means coupled in parallel relationship to said condenser for rapidly dissipating the energy stored in said condenser during the period that said energy storage device is being charged.

References Cited in the file of this patent

UNITED STATES PATENTS

| Number | Name | Date |
|---|---|---|
| 2,266,154 | Blumlein | Dec. 16, 1941 |
| 2,400,456 | Haine et al. | May 14, 1946 |
| 2,400,457 | Haine et al. | May 14, 1946 |
| 2,405,070 | Tonks et al. | July 30, 1946 |
| 2,409,897 | Rado | Oct. 22, 1946 |
| 2,413,063 | Miller | Dec. 24, 1946 |
| 2,422,086 | Evans | June 10, 1947 |
| 2,511,595 | Loughren | June 13, 1950 |